UNITED STATES PATENT OFFICE.

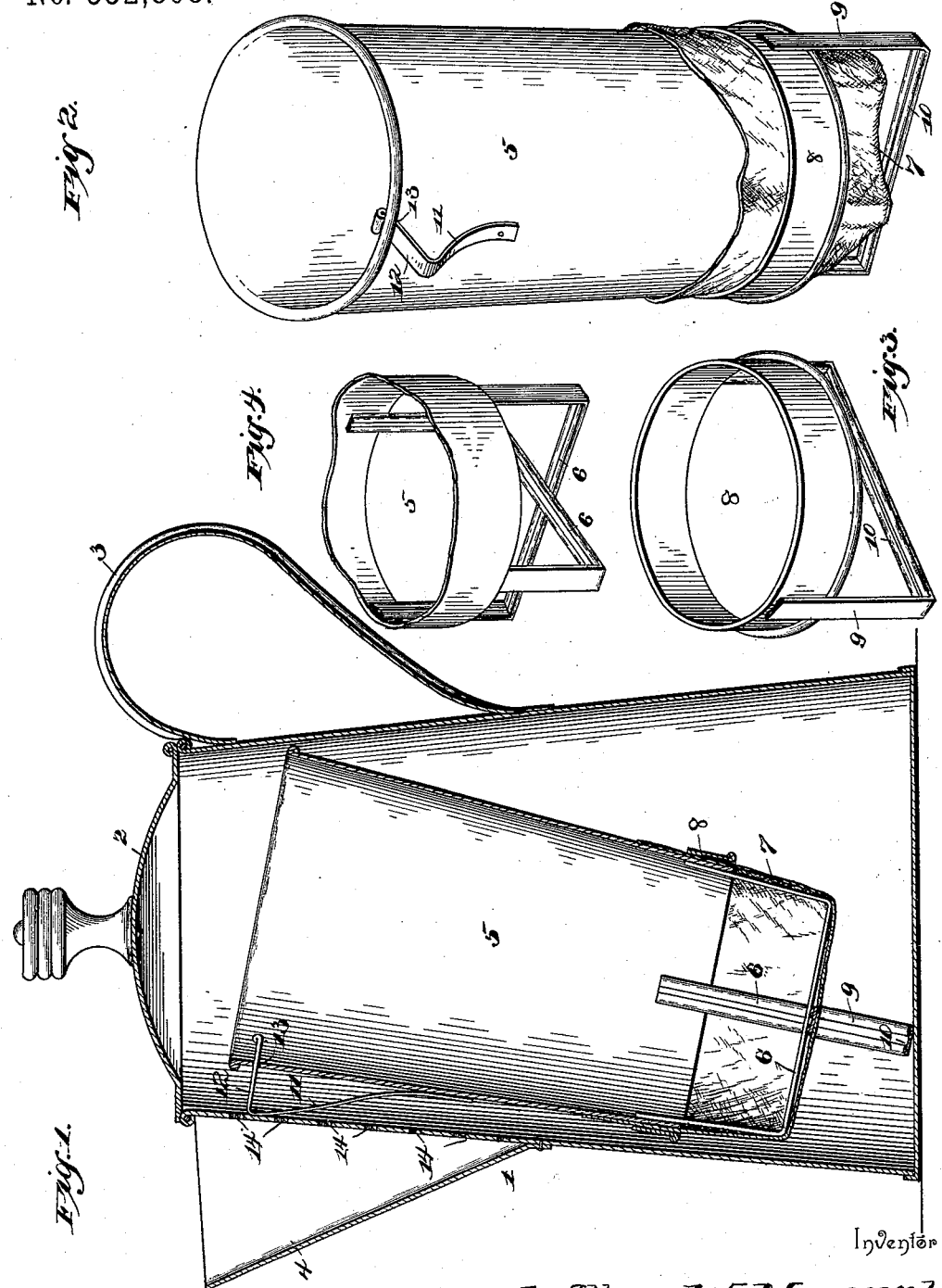

WILLIAM W. NEWCOMB, OF BRADFORDSVILLE, KENTUCKY.

COFFEE-POT.

SPECIFICATION forming part of Letters Patent No. 532,808, dated January 22, 1895.

Application filed September 11, 1894. Serial No. 522,735. (No model.)

*To all whom it may concern:*

Be it known that I, WILLIAM W. NEWCOMB, a citizen of the United States, residing at Bradfordsville, in the county of Marion and State of Kentucky, have invented a new and useful Coffee-Pot, of which the following is a specification.

This invention is particularly related to an improvement in that part of the coffee pot known as the "grounds receptacle;" and the object is to provide more effective means for securing the straining fabric thereto and for holding the receptacle above the bottom of the coffee pot.

A further object is to provide means for making the receptacle capable of use with various sized pots and for tilting the same so as to prevent the grounds from being poured out with the coffee.

In the accompanying drawings: Figure 1 represents a vertical section of a coffee pot constructed after the manner of my invention; Fig. 2, a perspective view of the grounds receptacle, showing it detached from the pot; Fig. 3, a detail perspective of the binding rim and supporting leg by which the straining cloth is held in place; Fig. 4, a detail perspective of the lower end of the grounds receptacle, showing the cross-bars provided therefor.

The reference numeral 1 indicates the coffee pot, which may be of any preferred construction and which is here shown to be provided with the usual top 2 and handle 3, together with the spout 4, all of which will be understood.

5 indicates the grounds receptacle, which consists of a slightly-tapering cylindrical tube open at each end and provided at its lower and smaller end with the bars 6. The bars 6 are two in number and have their ends rigidly secured by soldering or otherwise to the lower end of the receptacle, while they are bent to assume a rectangular form at points between their ends. These bars cross each other at right angles, and when complete form a downwardly-extending framework or skeleton over which the straining fabric 7 is stretched. The straining fabric 7 is large enough to cover entirely the bars 6 and to project up a slight distance along the sides of the receptacle.

8 indicates a metallic securing band, which is of a size that will permit its passing over the outer side of the receptacle 5, and is adapted to bind the fabric 7 in place.

Rigidly secured to, preferably by soldering, the outer side of the band 8, is the bar or strip 9, which is secured at its ends and at diametrically-opposite sides of the band.

Midway between the ends of the bar or strip 9 the strip is bent to form a horizontal portion 10, which is adapted to serve a two-fold function. The bar or strip 9, formed with its horizontal portion 10, is provided to permit its use as a handle and as a support for the grounds receptacle. All of this will be more fully described hereinafter.

Soldered, or otherwise rigidly secured, to the front side of the receptacle 5, is the spring 11, which is formed of a metallic strip bent at its upper end to comprise a horizontally-extending portion 12, which portion projects through an opening 13 in the front side of the receptacle 5 and at the upper end thereof. This spring 11 has a normal tendency to project away from the side of the receptacle 5, and is provided to permit adjusting, or rather to adapt, the receptacle to any sized coffee pot. By means of this spring the receptacle is prevented from rattling within the coffee pot, and is held out of contact with the perforations 14 attending the spout 4 of the coffee pot, thereby preventing the said perforations from becoming closed and stopping the flow of coffee.

In the use of my invention the receptacle 5 is arranged with its fabric 7 and band 8 in place, and then filled with coffee grounds, after which the receptacle is introduced into the coffee pot in a position which will place the spring 11 forward. This will throw the receptacle rearwardly at its upper end, which will cause the grounds to settle toward the rear side of the receptacle and which will prevent them from passing out the upper end of the receptacle when the pot is tilted in the operation of pouring out the coffee. The bar or strip 9 will operate to keep the receptacle 5 out of contact with the bottom of the pot, thus permitting a free circulation of water through the receptacle.

When it is desired to remove the grounds receptacle and to clean the same after using it, the bar or strip 9 may be utilized as a hand grip or bail to facilitate displacing the band 8. As the band 8 is displaced, the fabric 7 will be unsupported, and therefore in position to be cleansed.

The bars 6 and 9 are constructed, preferably, of sheet metal, such as tin, bent inwardly at its edges so that they will lie parallel with each other, as may be seen by reference to the drawings.

Various changes in the size, proportion and arrangement of the parts of my invention may be resorted to without departing from the substance thereof. Therefore I desire it understood that I am not restricted to the precise construction herein shown, but am entitled to all such variations as come within the above definition.

Having described the invention, I claim—

1. A coffee pot consisting of a main or body portion, a grounds receptacle removably located within the same and capable of free movement in every direction, the lower portion of the grounds receptacle being capable of allowing the water to pass through it, and a spring secured to and carried by the upper portion of the grounds receptacle and having a tendency to project away from the same, the said spring being engaged with the inner sides of the body portion and operating to push the grounds receptacle into snug engagement with the body portion, substantially as described.

2. A coffee pot consisting of a main or body portion, a grounds receptacle removably arranged therein and capable of free movement in all directions within the body portion, a plurality of bars secured to the lower end of the grounds receptacle and extending downwardly and thence transversely and crossing each other at the transverse portions, the said lower end of the grounds receptacle being open, a straining fabric stretched over the bars and over the lower end of the grounds receptacle, a binding ring embracing the lower end of the grounds receptacle and holding the straining fabric in place, a bar secured to the binding ring and projecting downwardly and transversely therefrom and forming a means for supporting the grounds receptacle, and a spring carried by the upper end of the grounds receptacle and having a tendency away from the same, the said spring being engaged with the inner sides of the body portion and operating to press the grounds receptacle into engagement with the said sides, substantially as described.

In testimony that I claim the foregoing as my own I have hereto affixed my signature in the presence of two witnesses.

WILLIAM W. NEWCOMB.

Witnesses:
E. F. DOUGLAS,
JO SURBER.